United States Patent [19]

Diller

[11] Patent Number: 5,040,118
[45] Date of Patent: Aug. 13, 1991

[54] APPARATUS AND METHOD EMPLOYING MULTIPLE CRASH EVALUATION ALGORITHMS AND EVALUATION EXPERTISE FOR ACTUATING A RESTRAINT SYSTEM IN A PASSENGER VEHICLE

[75] Inventor: Robert W. Diller, Pasadena, Calif.

[73] Assignee: TRW Technar Inc., Irwindale, Calif.

[21] Appl. No.: 432,197

[22] Filed: Nov. 6, 1989

[51] Int. Cl.$^5$ .................... B60R 21/32; B60R 21/00
[52] U.S. Cl. ........................... 364/424.05; 280/735; 180/282; 340/436; 307/10.1
[58] Field of Search ............... 180/232, 271, 282; 280/728, 734, 735; 307/10.1, 10.6, 10.7; 340/436, 438; 364/424.01, 424.03, 424.04, 424.05

[56] References Cited

U.S. PATENT DOCUMENTS

| | | | |
|---|---|---|---|
| 3,762,495 | 10/1973 | Usui et al. | 180/103 |
| 3,870,894 | 3/1975 | Brede et al. | 307/9 |
| 3,911,391 | 10/1975 | Held et al. | 340/52 H |
| 4,386,674 | 6/1983 | Sugata | 180/142 |
| 4,410,875 | 10/1983 | Spies et al. | 340/52 H |
| 4,497,025 | 6/1985 | Hannoyer | 364/424 |
| 4,836,024 | 6/1989 | Woehrl et al. | 73/514 |
| 4,842,301 | 6/1989 | Feldmaier | 280/735 |
| 4,994,972 | 2/1990 | Diller | 364/424.05 |

Primary Examiner—Thomas G. Black
Assistant Examiner—Thomas J. Auchterlonie
Attorney, Agent, or Firm—Tarolli, Sundheim & Covell

[57] ABSTRACT

Apparatus and method are presented for actuating a passenger restraint system in a passenger vehicle. A sensor senses vehicle deceleration and provides a deceleration signal having a value that varies in accordance with deceleration. A plurality of crash evaluation circuits each respond to the deceleration signal for evaluating the deceleration signal in accordance with respectively different crash evaluation algorithms. Each evaluation circuit provides a FIRE vote signal when its evaluation of the deceleration signal indicates that the restraint system should be actuated. A crash evaluation expertise circuit is associated with all but one of the plurality of crash evaluation circuits. Each expertise circuit has an expert output circuit for providing an expert signal when the expertise circuit determines that its associated evaluation circuit is an expert in evaluating the type of crash condition represented by the deceleration signal. The FIRE vote signals and the expert signals are summed to provide a summation signal having a value dependent on the sum of the signals. The restraint systems is actuated when the value of the summation signal exceeds a threshold level.

15 Claims, 8 Drawing Sheets

APPARATUS AND METHOD EMPLOYING MULTIPLE CRASH EVALUATION ALGORITHMS AND EVALUATION EXPERTISE FOR ACTUATING A RESTRAINT SYSTEM IN A PASSENGER VEHICLE

BACKGROUND OF THE INVENTION

1. Technical Field

The present invention is directed to controlling actuation of a vehicle passenger restraint system and is particularly directed to evaluating a crash condition with different crash evaluation algorithms for determining whether the crash condition is sufficient to warrant actuation of the restraint system.

2. Prior Art

Actuatable passenger restraint systems for vehicles are well known in the art. Such systems are used to sense a crash condition and, in response to such a condition, to actuate an airbag or lock a seat belt or actuate a pretensioner for a seat belt retractor.

The U.S. Pat. No. 3,870,894 to U. Brede et al. discloses an actuatable passenger restraint system employing an electrical transducer for providing an electrical signal indicative of a deployment condition, such as vehicle deceleration, for use in actuating such a restraint system. The transducer employed is a piezoelectric transducer operating as an accelerometer and provides an output signal having a value indicative of vehicle deceleration. That signal is evaluated in accordance with a particular crash evaluation algorithm. The crash evaluation algorithm involves integrating the output signal to provide an integrated signal representative of velocity. When the integrated signal reaches a predetermined value, a trigger signal is provided for actuating the restraint system.

The U.S. Pat. No. 3,911,391 to M. Held et al. is similar to that of Brede et al., but discloses a second crash evaluation algorithm. The second evaluation algorithm includes performing a double integration of the output signal of the accelerometer such that the integrated signal represents displacement. Once the integrated signal representative of displacement reaches a predetermined value, a trigger signal is provided for actuating the restraint system.

Brede et al. discloses a crash evaluation circuit employing a velocity algorithm. Held et al. discloses a crash evaluation circuit employing a displacement algorithm. However, Brede et al. and Held et al. have no provision for evaluating a crash condition with two or more different crash evaluation algorithms to determine whether the crash condition is sufficient to warrant actuation of the restraint system.

The U.S. Pat. No. 3,762,495 to Usui et al. discloses an apparatus for actuating a passenger restraint system in a vehicle which relies, in part, for its operation on sensing whether the rate of change of vehicle deceleration, i.e., jerk, exceeds a jerk threshold level. This may be referred to as a third crash evaluation circuit employing a jerk algorithm. Usui et al. also discloses an apparatus for actuating a passenger restraint system in a vehicle which relies, in part, for its operation on sensing whether the level of vehicle deceleration exceeds a deceleration threshold level. This may be considered as a crash evaluation circuit employing a deceleration algorithm. Moreover, Usui et al. discloses combining the two evaluation circuits so that both algorithms are concurrently employed. Each evaluation circuit produces an output signal when its algorithm determines that the restraint system should be deployed. When both evaluation circuits concurrently provide such an output signal, then a trigger signal is provided for actuating the restraint system. This may be considered as a system that requires a unanimous vote by the evaluation circuits, wherein each evaluation circuit has one vote.

Usui et al. has no provision for determining which of the two crash evaluation circuits is the expert in evaluating a crash condition under consideration and giving extra weight to that circuit's evaluation of the crash condition in deciding whether to actuate the vehicle restraint system.

SUMMARY OF THE INVENTION

The purpose of multiple algorithms is to provide better crash detection for all crash types than can be obtained with only one algorithm. Thus, there is implied the existence of one or more crash types which cannot be properly evaluated using a single algorithm. The self-determination of expertise must be tailored to recognize those particular crash types. If these exact crash types are not known one may nevertheless illustrate a specific implementation for a hypothetical scenario. The specific embodiment, described herein is therefore based on one such hypothetical scenario as follows.

Suppose that the main algorithm has been chosen with its parameters set for optimum performance on the preponderance of crash types. Suppose further that there are two crash types which are not evaluated properly by the main algorithm.

Specifically, suppose that for one of these types the acceleration signal is such that the main algorithm would fire the system when it is known that on this event no firing is desired. Suppose also that the displacement algorithm is particularly good at this crash type and that on this crash type, the displacement fails to reach its threshold in time but is known to have always reached a lower threshold. This might be due to the displacement lagging the velocity because of the delayed onset of large acceleration followed by the immediate presence of a large jerk. The displacement algorithm could then be modified to recognize its own expertise by requiring that its measured displacement fall between the two thresholds at the right time. In this instance, sufficiently heavy expert weighting of the displacement algorithm will cause it to override the main algorithm and result in no firing.

For the scond troublesome crash type in which the main algorithm is inadequate, suppose that a jerk always appears within a known time interval for that crash type and not for other crash types. The jerk algorithm could then be modified to recognize its own expertise by requiring that a jerk of at least a certain size (less than its regular firing threshold) is present during the interval. Note that in this case, unlike the one discussed above for the displacement algorithm, the jerk algorithm can vote for fire or for no fire depending upon its measurements with respect to its firing threshold.

The present invention is directed to improvements for controlling actuation of a passenger restraint system by employing multiple crash evaluation circuits including means for determining which circuit is an expert in evaluating a crash condition under consideration and giving extra weight to that circuit's evaluation in deciding whether to actuate the vehicle restraint system.

In accordance with one aspect of the present invention, apparatus is provided for actuating a passenger restraint system in a passenger vehicle wherein the apparatus includes a sensor for sensing vehicle deceleration and providing a deceleration signal having a value that varies in accordance with vehicle deceleration. A plurality of crash evaluation circuits each respond to the signal for evaluating the deceleration signal in accordance with respectively different algorithms. Each evaluation circuit provides a fire vote signal when its evaluation of the crash condition indicates that the restraint system should be actuated. A crash evaluation expertise circuit is associated with one or more of the plurality of crash evaluation circuits. Each expertise circuit has an expert output circuit for providing an expert signal when the expertise circuit determines that its associated evaluation circuit is an expert in evaluating the type of crash condition represented by the deceleration signal. The fire votes signals and the expert signals are summed to provide a summation signal having a value in accordance with the sum of the signals. The restraint system is actuated when the value of the summation signal exceeds a threshold level.

In accordance with another aspect of the invention, one of the expertise circuits has extra weight assigned to its expert vote to give its associated evaluation circuit absolute power in actuating or not actuating the restraint system.

BRIEF DESCRIPTION OF THE DRAWINGS

The foregoing and other features and advantages of the present invention will become more apparent to those skilled in the art, to which the present invention relates, from a reading of the following description of a preferred embodiment with reference to the accompanying drawings, in which.

DETAILED DESCRIPTION OF THE PREFERRED EMBODIMENT

Figure 1:
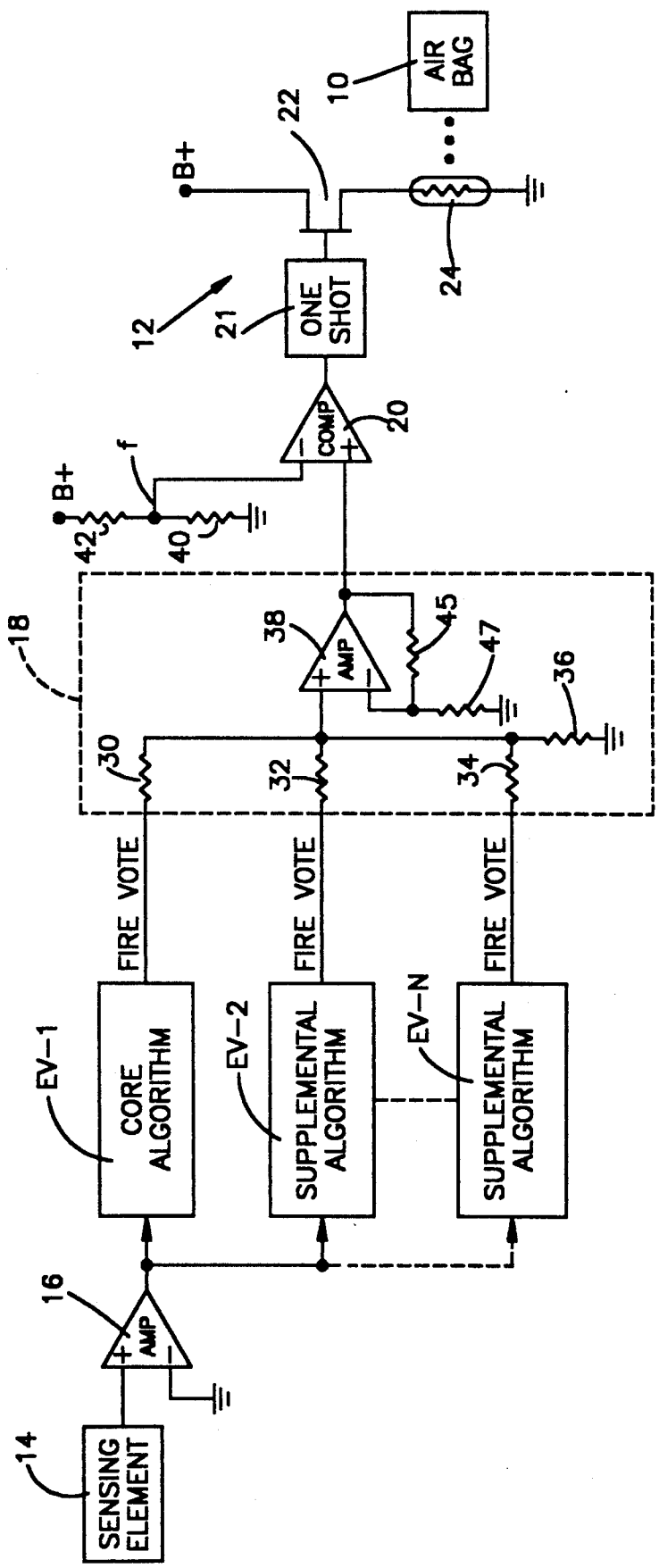
FIG. 1 is a schematic-block diagram illustration of a multiple algorithm circuit.

Reference is now made to the drawings and particularly to FIG. 1 which illustrates apparatus for actuating a passenger restraint system in a passenger vehicle wherein the restraint system includes an airbag 10 and a firing circuit 12. A single sensing element 14 provides a vehicle condition signal indicative of a potential deployment condition for actuating the airbag 10. The condition signal provided by the sensing element is a voltage signal having a value which varies with that of the deceleration of the vehicle. The condition signal is amplified by an amplifier 16 and the amplified signal is applied to a plurality of crash condition evaluation circuits EV-1, EV-2, and EV-N.

Each evaluation circuit evaluates the amplified condition signal in accordance with an associated crash condition algorithm, wherein the algorithms differ from each other, and then provides an output signal when its evaluation of the crash condition indicates that the restraint system should be actuated. This output signal is referred to hereinafter as a FIRE vote, indicating that the evaluation circuit has voted to fire the restraint system. The FIRE votes are summed by a summing circuit 18 which provides an output signal representative of the ratio of the number of FIRE votes to the potential total vote. This output signal or ratio signal is compared against a threshold level f by means of a comparator 20. When the ratio signal exceeds that of the threshold level f, the comparator 20 applies a trigger signal to the firing circuit 12.

The firing circuit 12 includes a one-shot circuit 21 which, upon receiving a trigger signal from comparator 20, provides a firing signal. The firing signal is maintained for a fixed duration of time sufficient to turn on a transistor switch taking the form of a field-effect transistor 22 having its drain-to-source circuit connected in series with a B+ voltage supply source and a squib 24 associated with the airbag 10. Once gated into conduction, the switching transistor 22 provides sufficient current for a sufficient period of time to ignite the squib 24 and deploy or inflate the airbag 10 in a known manner.

The sensing element 14 preferably takes the form of an accelerometer of the piezoresistive transducer type and is available from ICSensors, 1701 McCarthy Boulevard, Milpitas, Calif. 95035 under Model No. 3021.

Each of the crash evaluation circuits evaluates the amplified condition signal from the sensing element 14 in accordance with a different algorithm. For example, evaluation circuit EV-1 may employ a velocity algorithm, whereas evaluation circuit EV-2 may employ a displacement algorithm, and evaluation circuit EV-N may employ a jerk algorithm. These algorithms are implemented by circuitry to be described in greater detail hereinafter. Once an evaluation circuit has evaluated the condition signal in accordance with its associated algorithm, it makes a decision as to whether or not to vote for firing the restraint system. As will be described with respect to the detailed circuitry to be discussed hereinafter, each vote signal is represented by a positive voltage pulse having a magnitude on the order of 5 volts. The votes are summed by the summing circuit 18 which includes resistors 30, 32 and 34 connected to the output circuit of condition circuits EV-1, EV-2 and EV-N, respectively. These resistors 30, 32 and 34 are connected and form a voltage divider with a resistor 36 between ground and either a ground level (a no FIRE vote) or a B+ level, such as 5 volts, and which is representative of a FIRE vote. These votes are summed with a summing amplifier 38. The gain of amplifier 38 is determined by resistors 45 and 47.

The FIRE votes from the evaluation circuits may be treated equally and have equal weights or may be treated differently and have different weights. If they have equal weights, this means that each of the various algorithms has an equal vote or voice in deciding whether to actuate the restraint system. Thus, in the example being given with three evaluation circuits, there is a potential of three equal votes for a total vote of three. The decision to fire does not require that all evaluation circuits vote to fire the restraint system. A simple majority may rule. Thus, the threshold level f can represent a majority fraction of, for example, 0.50. The threshold level f may be obtained from a voltage divider including a pair of resistors 40 and 42 connected together in series between ground and a B+ voltage supply source. The resistances are chosen so that the threshold level f has a voltage representative of the desired majority fraction. Assuming a majority fraction of 0.5, only two FIRE votes are required for the ratio signal to be sufficient in magnitude that the comparator 20 applies a trigger signal to actuate the firing circuit 12. In an equal vote evaluation system, the resistors 30, 32 and 34 are each given an equal value, such as 2 R, wherein resistor 36 has a value of R. For this case, the gain of amplifier 38 is set at 5/3 by making resistor 45 equal to R and resistor 47 equal to 1.5 R. Consequently, with a majority fraction threshold level f of 0.50, two FIRE votes will result in the amplifier 38 providing a ratio signal of a magnitude of 0.67. Since this exceeds the threshold level f, the comparator 20 applies a trigger signal to the restraint system 12 for deploying the airbag 10.

There are crash evaluation conditions wherein different crash evaluation algorithms may disagree on whether or not to actuate the restraint system. One algorithm may be designated the core algorithm and other algorithms may be referred to as supplemental algorithms. The supplemental algorithms may work particularly well in those crash conditions in which the core algorithm is deficient in deciding whether or not to actuate the restraint system. Consequently, a simple majority vote may be sufficient to decide on whether to actuate the restraint system. This simple majority vote has been discussed thus far with respect to FIG. 1 wherein each algorithm has an equal vote.

Another aspect is to assign different weights to the FIRE votes obtained from the various evaluation circuits. These unequally weighted votes may be assigned according to the overall record of success that each evaluation circuit has in discriminating or in determining when to actuate the restraint system. The heaviest weight may be assigned to the core algorithm employed by evaluation circuit EV-1 and lower weights may be assigned to the supplemental algorithms employed by evaluation circuits EV-2 and EV-N. For example, the FIRE vote for the core algorithm in evaluation circuit EV-1 may be given a weight of three, whereas that for the supplemental algorithm in evaluation circuit EV-2 may be given a weight of two and that for supplemental algorithm in evaluation circuit EV-N may be given a weight of one. This presents 3-2-1 weighting and may be accomplished by assigning different resistance values to resistors 30, 32 and 34. If resistor 36 has a resistance value of R then, to accomplish the desired weighting, resistor 30 also has a value of R, whereas resistor 32 has a value of 1.5 R and resistor 34 has a value of 3 R. For this case, the gain of amplifier 38 is set at 1.5 by making resistor 45 equal to R and resistor 47 equal to 2 R. With this 3-2-1 weighting, the potential total vote is six. Consequently, the ratio signal obtained from amplifier 38 may increase in increments of 1/6 or approximately 0.17. Eight different examples may be examined. These are summarized in Table I below.

TABLE I

| NO. | STD. WT. | VOTE | TOT. VOTE | FIRE VOTE | FIRE/ TOTAL | RESULT |
| --- | --- | --- | --- | --- | --- | --- |
| 1 | 321 | NNN | 6 | 0 | 0.00 | NO FIRE |
| 2 | 321 | NNY | 6 | 1 | 0.17 | NO FIRE |
| 3 | 321 | NYN | 6 | 2 | 0.33 | NO FIRE |
| 4 | 321 | NYY | 6 | 3 | 0.50 | FIRE |
| 5 | 321 | YNN | 6 | 3 | 0.50 | FIRE |
| 6 | 321 | YNY | 6 | 4 | 0.67 | FIRE |
| 7 | 321 | YYN | 6 | 5 | 0.83 | FIRE |
| 8 | 321 | YYY | 6 | 6 | 1.00 | FIRE |

On examination of Table I, it will be noted that each column has a particular heading indicative of the information contained in the column. The first column refers to example number and eight examples are presented. The second column STD. WT. refers to the 3-2-1 weighting. The third column VOTE refers to the voting pattern of the different evaluation circuits in the order of evaluation circuits EV-1, EV-2 and EV-N. A "Y" means a yes vote and a "N" means a no vote. The next column is headed TOT. VOTE refers to the total vote. In this case, each example represents a total vote of six. The next column is headed FIRE VOTE and refers to the number of weighted FIRE votes. The next column is headed FIRE/TOTAL and represents the ratio of the number of weighted FIRE votes to the total vote. The last column is headed RESULT and indicates either a NO FIRE decision or a FIRE decision. The majority fraction represented by threshold level f, in this example, has been set at 0.45.

From Table I, it is seen from example 1 that with 3-2-1 weighting assigned to resistors 30, 32 and 34, three no votes by the evaluation circuits resulted in a NO FIRE decision. In example 2, the evaluation circuit EV-N voted yes to fire the restraint system, but this vote has a weight of one and the weighted FIRE vote/total vote fraction is 0.17 and this does not exceed the threshold level f. Hence, a NO FIRE decision was made. A similar result is seen with reference to example 3. Example 4 resulted in a FIRE decision, because evaluation circuits EV-2 and EV-N voted yes even though the evaluation circuit EV-1, employing the core algorithm, voted no. A similar result is found in example 5 wherein the only yes vote is obtained from the evaluation circuit EV-1, containing the core algorithm. Since the weighted level of this vote is 3, it exceeds the threshold level and a FIRE decision is made. Similar results are seen from the examples 6, 7 and 8 of Table I.

Implementation of Algorithms

Figure 2:
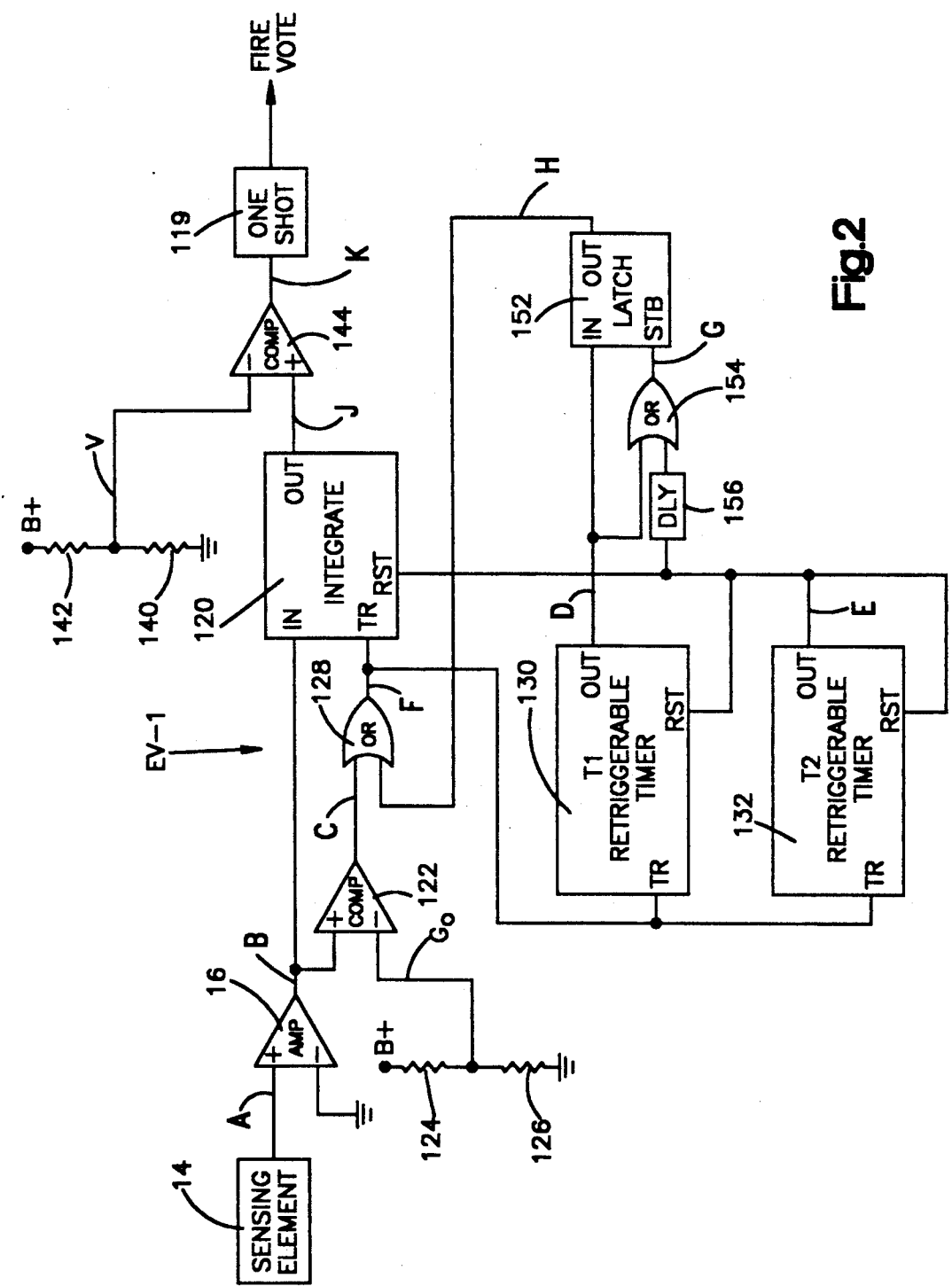
FIG. 2 is a schematic-block diagram illustration of a crash evaluation circuit used in the circuit of FIG. 1.
Figure 3:
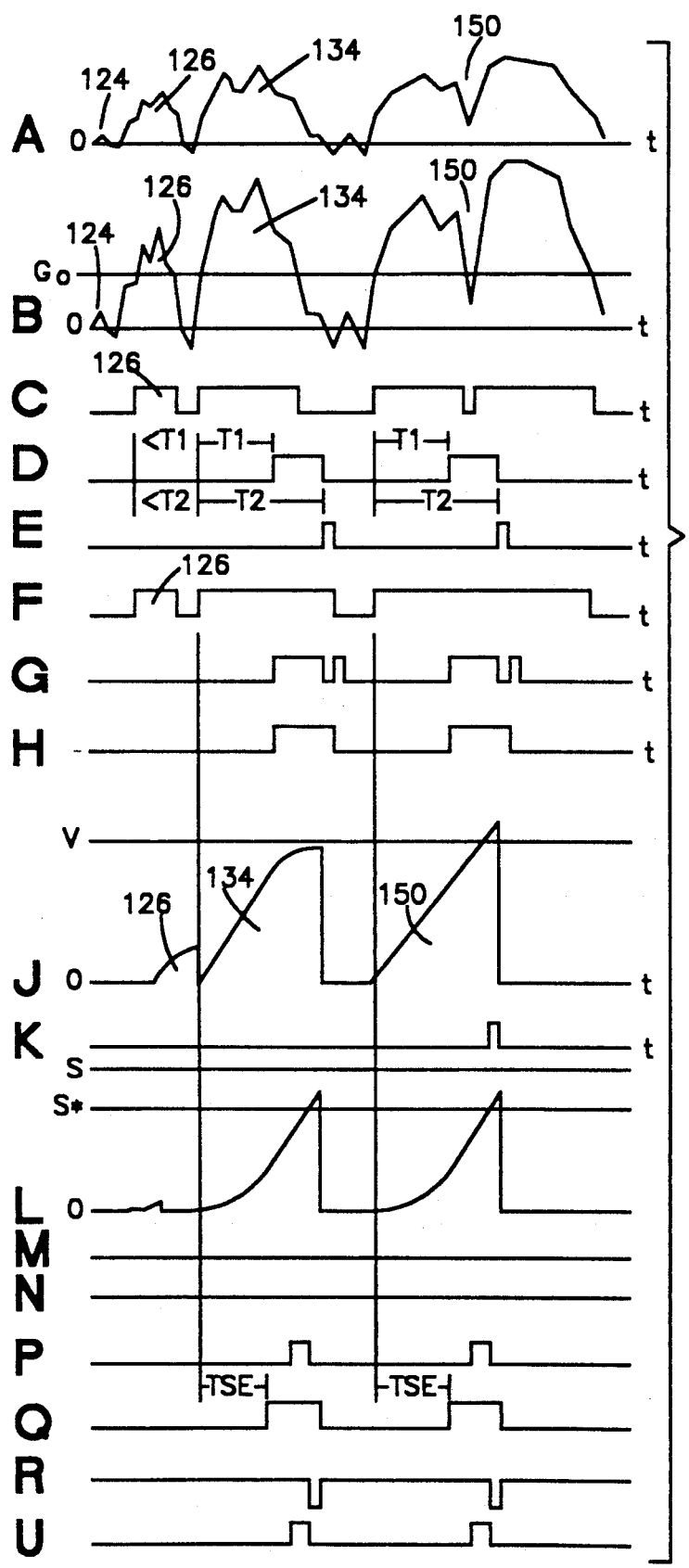
FIG. 3 presents waveforms A through U representative of certain voltage values which are present at various points of the circuits illustrated in FIGS. 2 and 4 and which are useful in describing the operation of FIGS. 2 and 4.
Figure 4:
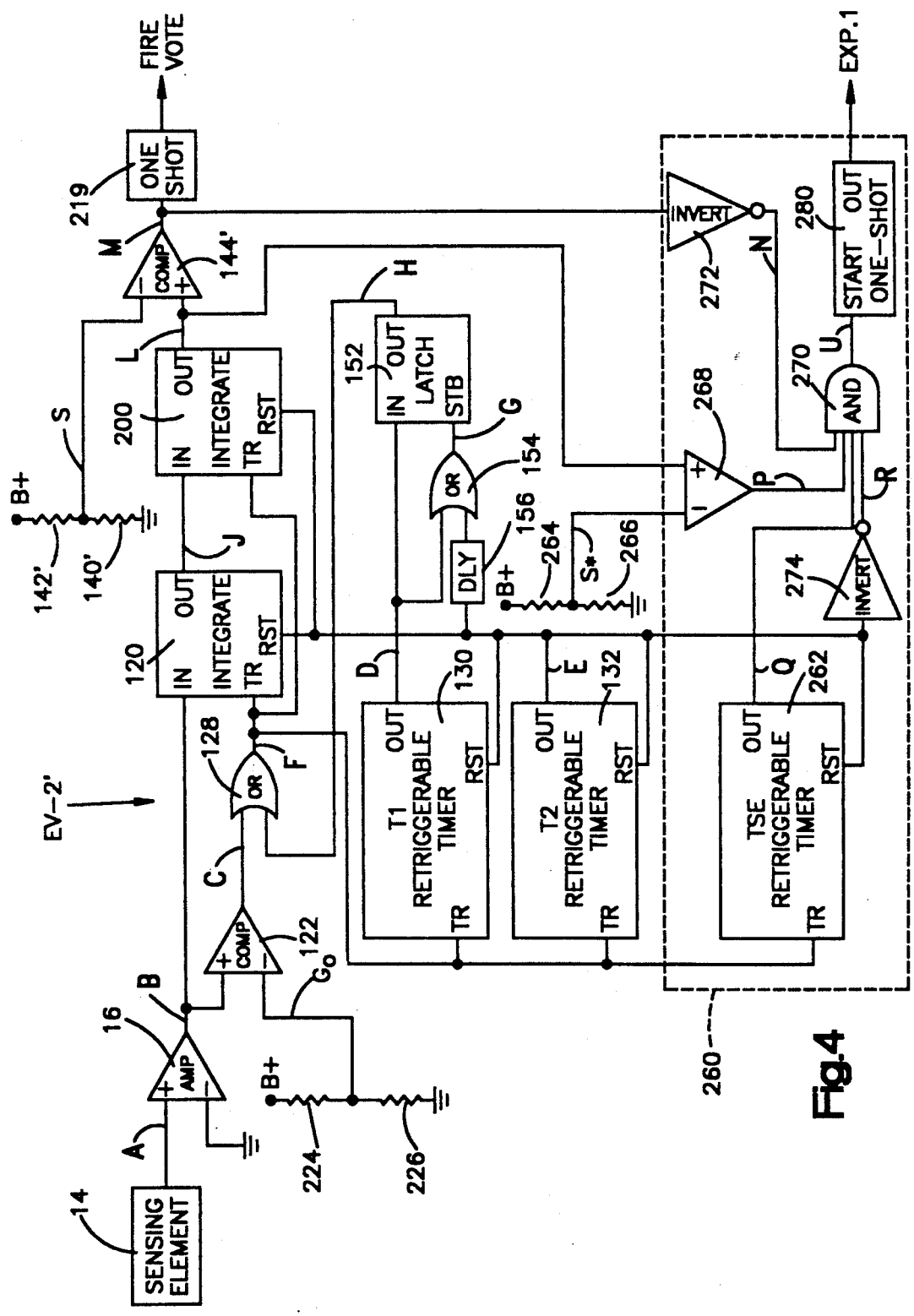
FIG. 4 is a schematic-block diagram illustration of another crash evaluation circuit used in the circuit of FIG. 1.
Figure 5:
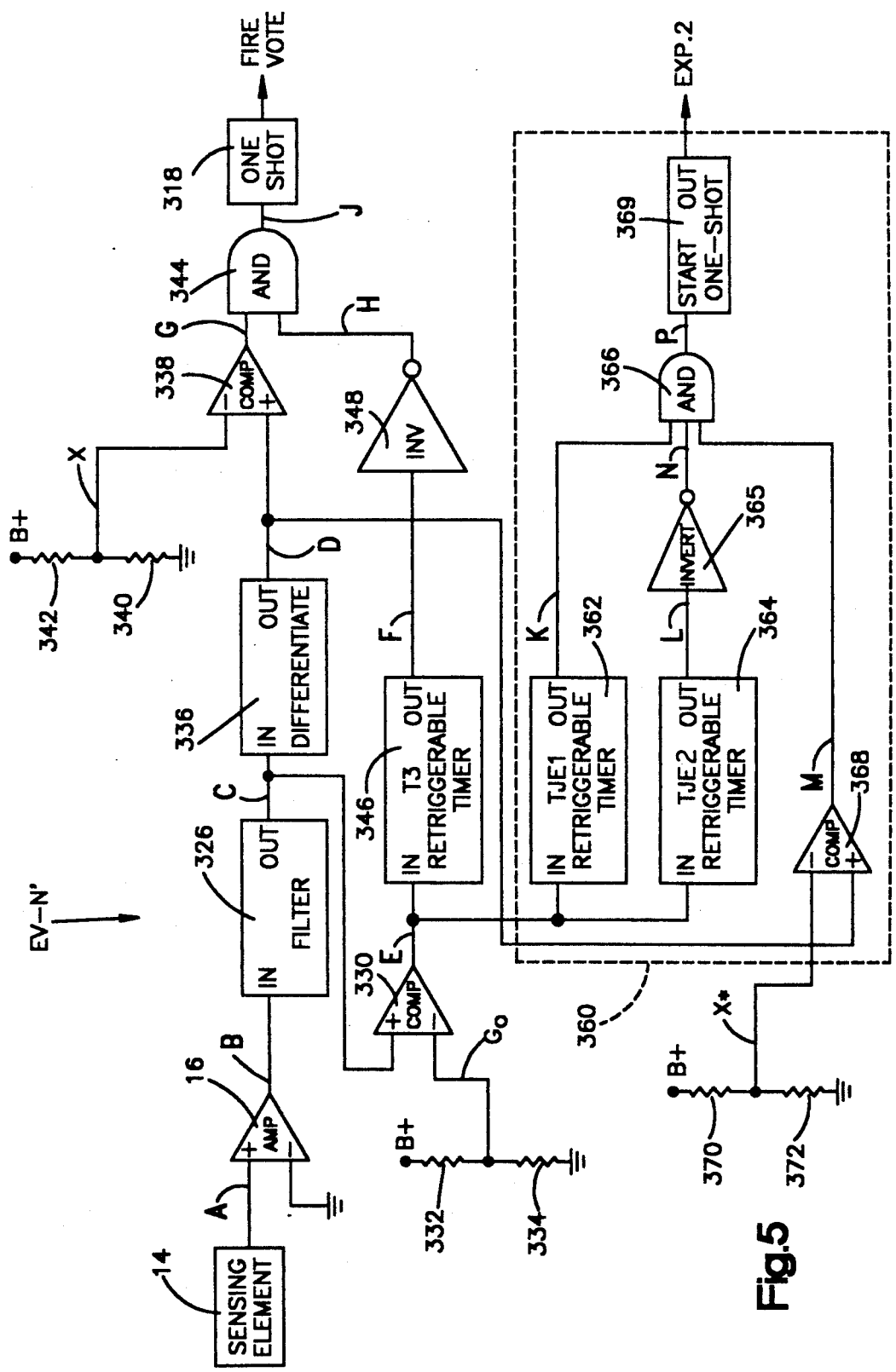
FIG. 5 is a schematic-block diagram illustration of still another crash evaluation circuit used in the circuit of FIG. 1.
Figure 6:
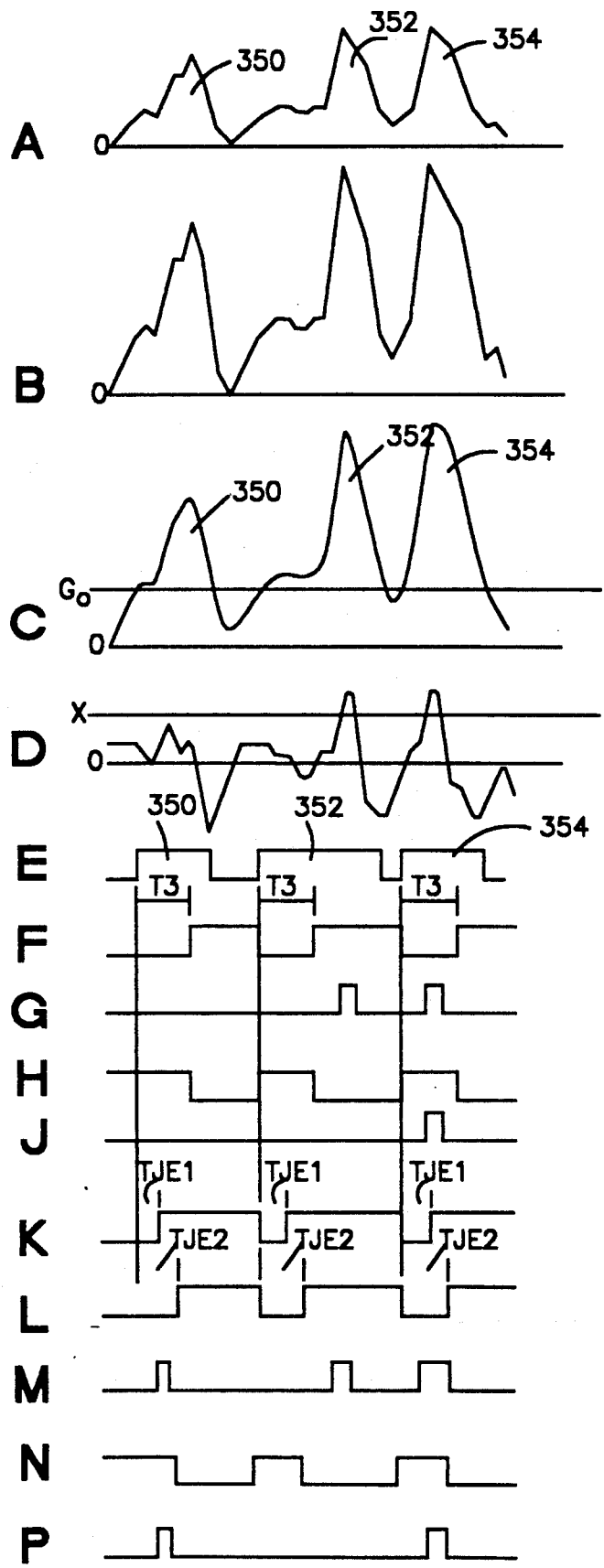
FIG. 6 presents waveforms A through P representative of certain voltage values which are present at various points of the circuit illustrated in FIG. 5 and which are useful in describing the operation of FIG. 5.

Reference is now made to FIGS. 2 through 6 which present implementations of the algorithms in the evaluation circuits EV-1, EV-2 and EV-N. FIGS. 2 through 4 are directed toward implementations of the algorithms employed by evaluation circuits EV-1 and EV-2, whereas FIGS. 5 and 6 are directed to the implementation of the algorithm employed by evaluation circuit EV-N.

As previously discussed, the core algorithm employed by evaluation circuit EV-1 is a velocity algorithm, whereas the supplemental algorithm employed by evaluation circuit EV-2 is a displacement algorithm. The main difference in implementing the two algorithms is that in the velocity algorithm, the amplified condition signal is integrated once, whereas in the displacement algorithm, the signal is integrated twice.

Reference is now made to FIG. 2 which illustrates a preferred form of implementing the velocity algorithm employed by the evaluation circuit EV-1.

During vehicle deceleration, the sensing element 14 provides an output signal representative of the deceleration of the vehicle. An illustration of this output signal is represented in FIG. 3 by the waveform A of voltage with respect to time. Waveforms B through K of FIG. 3, like waveform A, all represent voltage levels with respect to time at various points in the circuitry of FIG. 2 with the points having a corresponding label, i.e., points A through K. These waveforms will be of assistance in understanding the operation of the evaluation circuit EV-1 to be described below.

The condition signal, in this case a deceleration signal, obtained from the sensing element 14 is amplified by an amplifier 16. The amplified signal is then supplied to the input of integrator 120 which, when triggered on, will integrate the amplified deceleration signal.

For a deceleration signal to be representative of a potentially valid crash condition, it should exceed some minimum threshold level, $G_o$, representative of a deceleration on the order of, for example, 5 g. Decelerations of a lesser amplitude are considered herein as not being of sufficient magnitude to warrant consideration by the evaluation circuit EV-1 to determine if a valid crash condition exists. Consequently, the amplified deceleration signal is compared with a minimum threshold level $G_o$ by means of a comparator 122. The threshold level $G_o$ may be obtained from a voltage divider including resistors 124 and 126 connected between ground and a B+ voltage supply source. As seen by reference to the waveforms B and C, the comparator 122 will provide a positive output signal only so long as the magnitude of the amplified deceleration signal exceeds that of the minimum threshold level $G_o$. Thus, a low amplitude deceleration signal, such as that represented by waveform portion 124 in waveforms A and B, is not of sufficient magnitude to be recognized by the comparator 122. The output of the comparator remains low, as is shown in waveform C, so as not to trigger the integrator 120.

Once the amplified deceleration signal increases in magnitude beyond the minimum threshold level $G_o$, as is shown in portion 126 of the waveform B, the output of the comparator goes high and stays high so long as this condition continues, as is indicated by the positive signal at portion 126 of waveform C. This positive signal may be representative of a potentially valid crash condition. Hence, the signal is passed by an OR gate 128, as is seen by portion 126 in waveform F, to the trigger input of the integrator 120. The integrator 120 will now commence integration of the amplified deceleration signal supplied to its input and will output an integrated signal, as is seen at portion 126 of the waveform J in FIG. 3.

In order for an amplified deceleration signal that exceeds the minimum threshold level $G_o$ to be considered as a potentially valid crash condition, it should exceed the minimum threshold level for some minimum time duration T1, such as on the order of 5 milliseconds. This is to prevent short term signals, which might result from hammer or maintenance shocks in the neighborhood of the sensor, from actuating the vehicle restraint system. Consequently, at the same time that the OR gate 128 triggers the integrator 120 to commence integration of the amplified deceleration signal, it also triggers a timer 130 to commence timing a period corresponding to time duration T1 and then produce a positive signal at its output.

At this point, it should be recognized that the integrator 120 and the timer 130 as well as an additional timer 132, to be discussed hereinafter, are each of the type employing a retriggerable input, labelled TR. This means each of these circuits can be reset and started by the presence of a positive going edge signal at its input TR. In other words, the integrator 120 will be reset and begin to integrate when a positive edge signal is applied to its input TR and will continue to integrate until the application of another positive edge signal. Similarly, timers 130 and 132 will commence timing a time duration when a positive edge signal is applied to their respective inputs TR and will continue to time until reset and restarted by another positive edge signal. Each of the circuits 120, 130 and 132 also has an input designated RST which indicates that a positive edge signal applied to that input will cause the circuit to be reset without restart. That is, when a positive edge signal is supplied to the reset input RST of integrator 120, for example, the integrator is reset. However, no positive edge signal applied to that input will cause the integrator to restart and commence integrating.

As discussed above, once the amplified deceleration signal exceeds a minimum threshold $G_o$, the integrator 120 commences to integrate the signal and supply an integrated output signal and the timer 130 commences timing a time period T1. This takes place on the positive-going edge of the output signal from comparator 122. In the first situation under consideration by the evaluation circuit, as defined by the waveform portion 126, the amplified deceleration signal is above the minimum threshold level $G_o$ for a time duration less than that of time period T1. Consequently, the output of timer 130 does not go positive. Once the deceleration signal decreases below that of the minimum threshold level $G_o$, the output of the comparator goes low and, on its next positive edge, it resets the integrator 120 and timers 130 and 132, as is indicated in the waveforms C, D, E and J of FIG. 3. Note from waveforms D and E that there is no positive output pulse from either timer during this condition, since the timers were reset and never timed out. The foregoing illustrates the operation of the evaluation circuit EV-1 when a deceleration signal, as indicated by waveform portion 126 in waveforms A and B, is not of greater magnitude than the minimum threshold level $G_o$ for a sufficiently long period of time T1 to be considered as a potentially valid crash condition.

A third condition which may be examined by the evaluation circuit EV-1 is that represented by portion 134 in waveforms A and B. The magnitude of the amplified deceleration signal is greater than the minimum threshold level $G_o$ for a time duration greater than that of time period T1. This is representative of a potentially valid crash condition. If the magnitude of the output integrated signal from the integrator 120 also exceeds a threshold level V within a time period T2 from the commencement of the integration operation, the restraint system will be deployed. The time period T2 is indicative of the maximum duration from inception of a crash during which the evaluation circuit EV-1 should determine if the magnitude is sufficient to actuate the vehicle restraint system. Time period T2 may be on the order of 100 milliseconds. The magnitude of the threshold level V represents a fictitious velocity which is not directly related to the velocity of the crash and is determined by examining empirical crash data which varies with the type of vehicle involved. For purposes of illustration, the fictitious velocity level V may be considered as five miles per hour.

The threshold level V may be obtained from a voltage divider including a pair of resistors 140 and 142 connected between ground and a B+ voltage supply source and ;s supplied to one input of a comparator 144. When the integrated signal provided at the output of the integrator 120 exceeds the threshold level V, a trigger signal is supplied by the comparator to actuate the one-shot circuit 119 to provide a FIRE vote.

The evaluation circuitry EV-1 evaluates the deceleration signal to see whether the signal is of sufficient magnitude and duration that it represents a potentially valid crash. This is accomplished, as in the case of the deceleration signal at portion 134 of the waveforms, by determining that the amplified deceleration signal exceeded the minimum threshold level $G_o$ for a time duration greater than or at least equal to time period T1. Thereafter and prior to the termination of time duration T2, the evaluation circuit will continue to determine whether the integrated signal exceeds the threshold level V even though the magnitude of the amplified deceleration signal decreases below minimum threshold level $G_o$. It is during the time interval between the termination of time period T1 and the termination of time period T2 that the integrator 120 is prevented from being reset. This prevents termination of evaluating an otherwise potentially valid crash condition merely because of a momentary drop in the magnitude of the deceleration signal, as is the case represented by waveform portion 150 to be discussed hereinafter.

The circuitry to prevent the integrator 120 from being reset and thereby terminating the evaluation once it has been determined that a potentially valid crash condition is taking place will now be described. Once the timer 130 has timed out, its output circuit will go positive, as indicated by the waveform D in FIG. 3. This positive signal is supplied to the input of a latch circuit 152. The latch circuit 152 has a strobe input designated STB which, upon receiving a positive edge signal, will strobe the signal applied to its input terminal IN to its output terminal OUT and latch it there until subsequently reset. When the output of the timer 130 goes high, it applies a positive-going signal to the input terminal IN of the latch circuit 152 and also supplies a positive signal by way of an OR gate 154 to the strobe input STB. This causes a positive signal to be applied through the OR gate 128 to maintain a positive signal on the trigger input TR of the integrator 120 even though the output of the comparator 122 now goes low. The integrator 120 will continue to integrate the signal represented by waveform portion 134, once timer 130 has timed out, and will continue integrating the signal even though the magnitude of the signal decreases below the minimum threshold level $G_o$.

In the meantime, the timer 132 continues to time the time period T2 and upon the completion of this time period, it provides a positive output signal, as indicated in waveform E. The positive edge signal is applied to the reset input RST of timer 130 and to the reset input RST of integrator 120 as well as to its own RST input. This resets timers 130 and 132 and resets integrator 120. In the case under consideration by evaluation circuit EV-1, the integrated output signal of waveform portion 134 did not exceed the threshold level V. In such case, the comparator 144 does provide a trigger signal to the one-shot 119 and the one-shot does not provide a FIRE vote. The evaluation circuit EV-1 has determined that the condition being evaluated indicated that a potentially valid crash condition for deploying the restraint system took place because the deceleration signal exceeded the minimum threshold level $G_o$ for a time duration greater than time period T1, but the magnitude of the condition was not sufficient for the integrated signal to exceed the threshold level V before the time period T2 expired.

Reference is now made to waveform portion 150 in waveforms A and B of FIG. 3. As will be described below, this crash condition is sufficient in magnitude that the amplified deceleration signal exceeds the minimum threshold level $G_o$ for a time duration greater than time T1 and, hence, is considered a potentially valid crash condition for actuating the restraint system. However, the amplified deceleration signal momentarily drops below the minimum threshold level $G_o$ during the interval after the time period T1 has expired and before the time period T2 has expired. Thereafter, the deceleration signal increased in magnitude well beyond the minimum threshold level $G_o$. Such a momentary decrease in the deceleration signal may happen during a valid crash condition otherwise requiring that the restraint system be actuated. During a valid crash condition, various vibrations of an erratic nature may take place as the vehicle structure is deforming. Consequently, a momentary decrease in the deceleration signal below the minimum threshold level $G_o$ in an otherwise valid crash condition requiring deployment of the restraint system should not cause the integrator to be reset and thereby not provide a FIRE vote.

The condition discussed immediately above with respect to waveform portion 150 does not cause the integrator 120 to be reset. Thus, once the timer 130 has timed out the time period T1, it produces a positive-going signal at its output circuit. This positive-going signal is latched through the latch circuit 152, as previously discussed, to maintain a positive signal applied to the input TR of the integrator 120 even though the output of the comparator 122 goes low. The integrator 120 continues to integrate the amplified deceleration signal and the comparator 144 continues to compare the integrated signal from the output of the integrator with the threshold level V. In the situation under consideration, the integrated signal exceeded the magnitude of the threshold level V before timer 132 has timed out, thereby supplying a trigger signal to actuate the one-shot circuit 119 to provide a FIRE vote.

Once timer 132 times out, it resets timer 130 and integrator 120 and itself, as discussed hereinabove. The output of timer 130 now goes low, and the output from the timer is supplied to the input terminal IN of the latch circuit 152. To ensure that the signal to the input terminal IN of latch circuit 152 is low before the signal is strobed to the output circuit of the latch circuit, the positive-going signal from the timer 132 is delayed somewhat with a delay circuit 156 before being applied to the strobe input STB of the latch circuit. When the positive-going signal is applied to the strobe input STB, the output of the latch circuit goes low and the low output signal is applied through OR gate 128 so that its output then follows that of comparator 122. Moreover, by resetting the integrator after time T2, the integrator is prevented from accumulating integrated signals from one evaluation of a crash condition to the next.

Displacement Algorithm

The displacement algorithm employed by the evaluation circuit EV-2 is illustrated in FIG. 4 to which reference is now made. This evaluation circuit is similar to that of evaluation circuit EV-1 illustrated in FIG. 2. In view of the similarities, like components in FIGS. 2 and 4 are identified with like character references. Only the differences will be discussed in detail below.

The evaluation circuit EV-2 employs a second integrator 200 which is identical to integrator 120 but performs a second integration so that the output of integrator 200 represents a fictitious displacement as opposed to the fictitious velocity represented by the output of integrator 120 in FIG. 2. Integrator 200 has its input terminal IN connected to the output terminal OUT of integrator 120. The trigger input TR of integrator 200 is connected to the trigger input TR of integrator 120 and the reset input RST of integrator 200 is connected to the reset input RST of integrator 120. Consequently, when integrator 120 is triggered or reset, the same occurs to integrator 200.

The operation of this circuit EV-2 is the same as that described with reference to FIGS. 2 and 3 except that a second integration is made to obtain a fictitious displacement signal which is then compared with a trigger threshold level S by means of a comparator 144'. The threshold level S may be obtained as from a voltage divider including resistors 140' and 142' connected together in series between ground and a B+ voltage supply source. Once the output of comparator 144' goes positive, it will activate the one-shot circuit 219 to provide a FIRE vote.

Jerk Algorithm

As previously discussed, the algorithm employed in evaluation circuit EV-N is a jerk algorithm. Jerk, as employed herein, means the rate of change of vehicle deceleration. A preferred implementation of the jerk algorithm employed by evaluation circuit EV-N is illustrated in FIG. 5 and its operation is depicted by the waveforms of FIG. 6.

During vehicle deceleration, the sensing element 14 provides an output signal having a value which varies with deceleration of the vehicle. An illustration of this output signal is represented in FIG. 6 by waveform A of voltage with respect to time. Waveforms B through J of FIG. 6, like waveform A, all represent voltage levels with respect to time at various points in the circuitry of FIG. 5 with the points having a corresponding label, i.e., points A through J. These waveforms will be of assistance in understanding the operation of the evaluation circuit EV-N to be described below.

The condition signal, in this case a deceleration signal, obtained from sensing element 14 is amplified by amplifier 16 with the amplified signal then being filtered by a low-pass filter 326. The filtering removes various high frequency spikes and noise which may be present on the amplified signal and which are not representative of a jerk condition.

For a deceleration signal to be representative of a potentially valid crash condition, it should exceed some minimum threshold level, $G_o$, representative of a deceleration on the order of, for example, 5 g. Decelerations of lesser amplitude are considered herein as not being of sufficient magnitude to warrant consideration by the evaluation circuit EV-N to determine if a valid crash condition exists. Consequently, the filtered deceleration signal is compared with a minimum threshold level $G_o$ by means of a comparator 330. The threshold level $G_o$ may be obtained from the junction of a voltage divider including resistors 332 and 334 connected between the ground and a B+ voltage supply source. As seen by reference to the waveforms C and E, the comparator 330 will provide a positive output signal only so long as the magnitude of the filtered deceleration signal exceeds that of the minimum threshold level $G_o$. Thus, a low amplitude deceleration signal having a magnitude less than the threshold level $G_o$ is not sufficient to be recognized by the comparator 330 and, hence, the output of the comparator remains low.

The filtered deceleration signal provided by the filter 326 is also supplied to a differentiator 336 which provides at its output circuit a differentiated signal which varies in magnitude with that of the rate of deceleration, or jerk. The differentiated signal, or jerk signal, is depicted in waveform D of FIG. 6. For the jerk signal to be sufficient to produce a FIRE vote, it must exceed a jerk threshold level X within a predetermined period of time T3, providing that the filtered deceleration signal continuously exceeds the threshold level $G_o$.

The comparison with threshold level X is accomplished with a comparator 338 that compares the jerk signal with a jerk threshold level X and provides a positive output signal so long as the jerk signal exceeds this threshold. The jerk threshold level X may be obtained from a voltage divider including a pair of resistors 340 and 342 connected in series between a B+ voltage supply source and ground. So long as the jerk signal obtained from the differentiator 336 exceeds the jerk threshold level X, the comparator 338 will provide a positive signal at its output. The positive signal from the comparator 338 is supplied as one input to an AND gate 344 which must be enabled before a trigger signal can be supplied to actuate the one-shot circuit 318.

The enabling signal for the AND gate 344 takes place only during the time period T3. When the output of the comparator 330 becomes positive, it actuates a timer 346 which then times the time period T3 so long as the output of the comparator 330 remains positive. The timer 346 is reset once the output of comparator 330 goes low. Consequently, the output of the timer 346 is low during the time period T3. The timer output signal is inverted by an inverter 348 to provide a positive signal during the interval that the timer 346 is timing the time period T3. The inverted positive signal is supplied to the AND gate 344 so as to enable the AND gate during the time period T3. If, during that time period, the output of the comparator 338 goes high, the AND gate 344 will apply a trigger signal to actuate the one-shot circuit 318.

At this point, it should be recognized that the timer 346 is of the type employing a retriggerable input, labelled IN. This means that the timer can be reset and started by the absence and presence, respectively, of a positive signal applied to its input IN. Thus, the timer is operative in response to a positive signal supplied to its input IN for timing the time period T1, but may be reset on the negative edge or termination of this positive signal. In such a case, the timer will not time out and will not provide a positive signal at its output terminal OUT.

Reference is now made to FIG. 6 which illustrates three vehicle deceleration conditions at waveform portions 350, 352 and 354 to be evaluated by the evaluation circuit EV-N to determine the existence of a valid crash condition.

The first condition, represented by waveform portion 350, represents a vehicle deceleration of sufficient magnitude that it exceeds the threshold $G_o$. In response to this deceleration, the output of the comparator 330 goes positive, causing the timer 346 to commence timing the time period T3. However, during the time period T3, the jerk signal, as indicated by the waveform D, does not exceed the jerk threshold level X. Consequently, during the period that the AND gate 344 is enabled, the output of the comparator 338 remains low and no trigger signal is supplied to the one-shot circuit 318. Thus, the evaluation circuit EV-N determined that the condition represented by waveform 350 is not sufficient to trigger the restraint system.

The second condition being evaluated is represented by waveform portion 352 in FIG. 6. As seen from waveform C, this condition indicates that the vehicle deceleration is sufficiently large that it exceeds the minimum threshold level $G_o$, causing the output of comparator 330 to go positive and actuate the timer 346. During the time period T3, the jerk signal remains below the jerk threshold level X and the enabled AND gate 344 does not supply a trigger signal to actuate the one-shot circuit 318. This condition also shows that the jerk signal exceeds the jerk threshold level X after the timer 346 has timed out and the AND gate 44 is no longer enabled. Thus, the evaluation circuit EV-N has determined that while the jerk signal attained a sufficient magnitude to deploy the restraint system, the required magnitude of the jerk signal came too late. The time period T3 may be on the order of 20 milliseconds, and the time period for a crash condition may be on the order of 100 milliseconds. A late determination of an otherwise valid jerk is indicative, for example, of a vehicle crashing into a telephone pole at a low speed, on the order of 15 miles per hour. Such a condition may not be a sufficient threat to the passengers to warrant deployment of the restraint system.

The third condition presented in FIG. 6 for evaluation is represented by waveform portions 354. From an examination of the waveforms in FIG. 6, it is seen that this condition presents a vehicle deceleration of sufficient magnitude to exceed the minimum threshold level $G_o$, causing the timer 346 to commence timing the time period T3. During time period T3, the timer 346, by way of inverter 346, enables the AND gate 344 as seen in waveform H. In the condition under examination, the magnitude of the jerk signal exceeds the jerk threshold level X before the timer times out. Consequently, a positive signal is applied by the comparator 338 to enabled AND gate 344 which then applies a trigger signal to the one-shot circuit 318 which then provides a positive output signal FIRE vote.

Expertise Circuit

Figure 7:
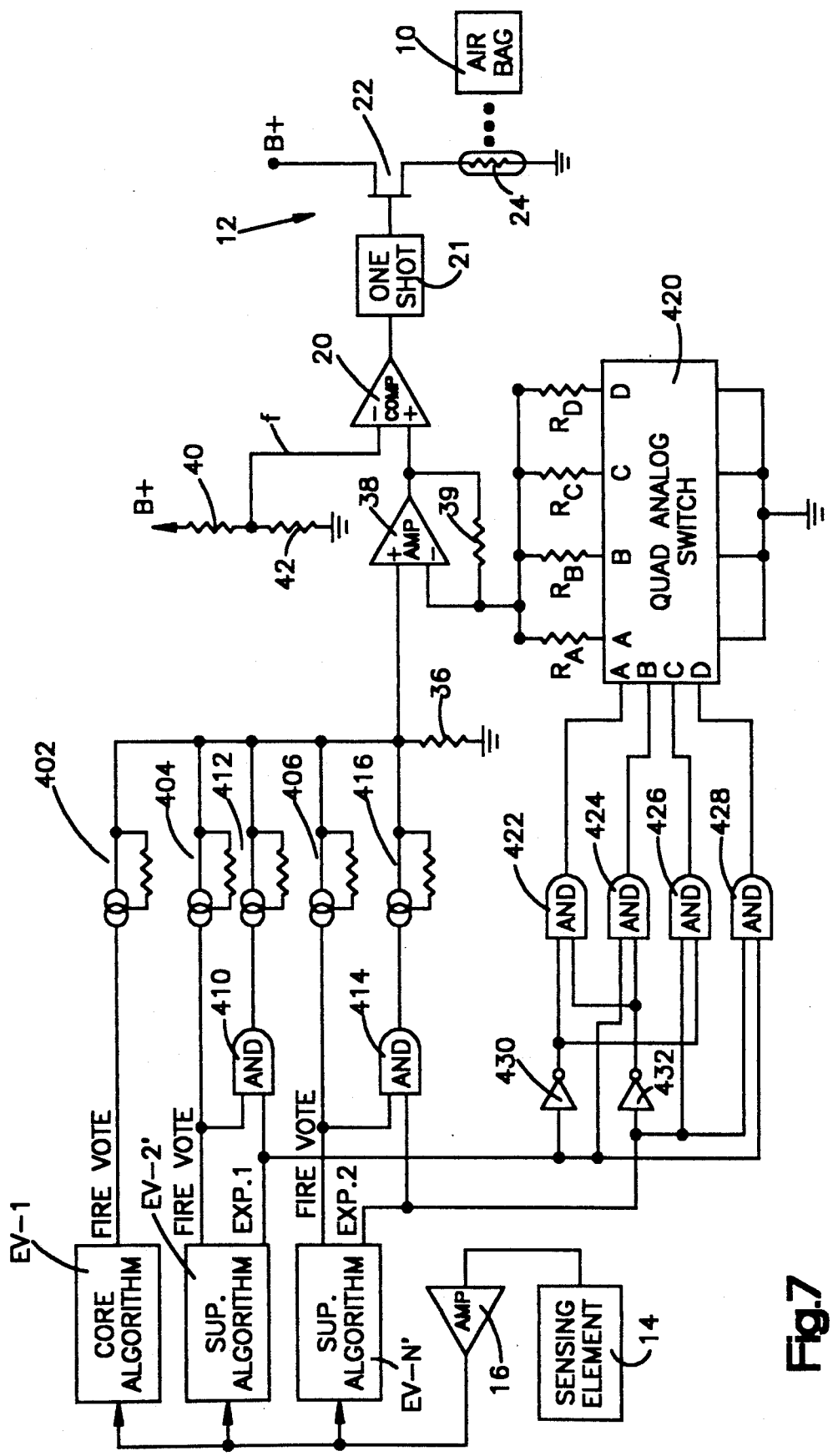
FIG. 7 is a schematic-block diagram illustration of one embodiment of the present invention.

Reference is now made to FIG. 7 which illustrates circuitry similar to that in FIG. 1. In view of the similarities, like components are identified with like character references and only the differences in FIG. 7 will be described herein in detail.

FIG. 7 incorporates crash evaluation circuits EV-1, EV-2' and EV-N'. Circuit EV-1 is identical to that in FIG. 1 and illustrated in detail in FIG. 2. This evaluation circuit has a single output for providing either zero output signal or a positive output signal referred to herein as a FIRE vote.

In the embodiment of the invention illustrated in FIG. 7, the evaluation circuits each have a FIRE vote, as described hereinbefore with reference to FIG. 1. Additionally, two of the evaluation circuits are each provided with an additional vote, called an expert vote. Each of these circuits is also provided with an expertise circuit for determining whether it is an expert in analyzing a particular type of crash. The FIRE votes are weighted in the same manner as discussed hereinbefore with reference to Table I. Thus, the FIRE votes have a weighting of 3-2-1. Each expert vote has a weighting of 1. If an evaluation circuit having an expert vote, decides that it is an expert and outputs a FIRE vote, then the circuit will have an extra vote because of the expert vote. This will be more readily understood from the discussion with reference to FIG. 7.

Evaluation circuit EV-2' incorporates all of the circuitry employed in evaluation circuit EV-2 and additionally includes expertise circuitry, to be described in greater detail hereinafter, so that it has two outputs. One output carries a positive signal representative of a FIRE vote when the algorithm decides to vote for actuating the restraint system and the second output is an expert output, designated EXP1. The ouput EXP1 carries a positive signal when the expertise circuitry has determined that this algorithm is an expert on the particular type of crash being evaluated. This will be discussed in greater detail below.

Similarly, the crash evaluation circuit EV-N' incorporates all of the circuitry described hereinbefore with respect to evaluation circuit EV-N and also incorporates an expertise circuit. The evaluation circuit EV-N' has two outputs, one for providing a FIRE vote and the other, designated EXP2, for providing a positive signal indicative of this circuit being an expert on the crash condition being evaluated.

FIG. 7 also differs from FIG. 1 by including current sources in the output circuits of the evaluation circuits EV-1, EV-2', and EV-N'. Thus, the FIRE vote output circuit of evaluation circuit EV-1 has a current source 402 connected in series with resistor 36. Similarly, the FIRE vote output circuit of evaluation circuit EV-2' has a current source 404 connected in series with resistor 36. Also, the FIRE vote output circuit of evaluation circuit EV-N' has a current source 406 connected in series with resistor 36. These are weighted current sources presenting a weighting of 3-2-1. That is, the current flow provided by current source 402 is three times that provided by current source 406 and the current flow provided by current source 404 is twice that provided by current source 406. These current sources may be obtained from National Semiconductor Corporation, under Model No. LM-134. Each is programmed to provide a specific amount of current in the range of one-half to three milliamperes when its associated FIRE vote output circuit provides a positive output voltage in excess of one volt. If the current flowing from current source 406 is i, and this may be on the order of 0.5 milliamperes, the current flowing from source 404 is 2 i and the current flowing from source 402 is 3 i.

In operation, one or more FIRE votes will cause current to flow through resistor 36 to develop a voltage thereacross. This is supplied to the summing amplifier 38 having a feedback resistor 39 having a resistance R, corresponding with that of resistor 36. The output of the amplifier 38 provides a ratio signal in the same sense as that of amplifier 38 in FIG. 1. This is the ratio of FIRE votes to the potential total votes. When the value of this ratio signal exceeds that of the majority fraction threshold level f, the comparator 20 provides a trigger signal for actuating the restraint system 12 in the manner as discussed hereinbefore.

In the weighted version of the circuit in FIG. 1, and as discussed with reference to Table I, the potential total vote for the disclosed 3-2-1 weighting is six. The total vote in one version of the embodiment of FIG. 7 can be 6, 7 or 8. In another version, referred to as the absolute power version, the total vote may be as high as thirteen.

The details of the expertise circuits contained in evaluation circuits EV-2' and EV-N' will be discussed in detail hereinafter with reference to FIGS. 4 and 5. First, however, a description is presented herein of the manner in which the expert votes are summed along with the FIRE votes with reference to FIG. 7.

An expert vote provided by one of the evaluation circuits EV-2' and EV-N' will be counted as an extra FIRE vote only if the associated algorithm provides a FIRE vote. This is implemented in FIG. 7, for evaluation circuit EV-2', with an AND circuit 410 having its inputs connected to the two outputs of the evaluation circuit and its output circuit being connected in series with a current source 412 in series with the resistor 36. This is implemented for the evaluation circuit EV-N' with an AND gate 414 having its inputs connected to the two outputs of the evaluation circuit and its output circuit being connected in series with a current source 416 in series with the resistor 36. Since each expert vote receives a weight of one vote, the current sources 412 and 415 are each adjusted to provide a current flow of i.

Since it is possible to have two expert votes in addition to six FIRE votes, the total vote may now be 6, 7 or 8. In order for the summing circuit to provide a correct ratio signal to the comparator 20, the gain of the amplifier 38 must be varied whenever an expert vote is to be counted.

The gain of the summing amplifier 38 is adjusted by connecting the feedback resistor 39 to ground by way of either resistor $R_A$, $R_B$, $R_C$ or $R_D$. The choice of which resistor $R_A$ through $R_D$ is to be connected depends on the pattern of the expert votes. Since there are two expert votes, there is a possibility of four different vote patterns. These four patterns include no expert vote, an expert vote from only evaluation circuit EV-2', an expert vote from only evaluation circuit EV-N', and an expert vote from both evaluation circuits EV-2' and EV-N'. These four expert vote patterns respectively select resistors $R_A$, $R_B$, $R_C$ and $R_D$ as the resistor to be connected between ground and resistor 39. This selection is achieved with the circuitry to be described below.

A quad analog switch circuit 420 has four inputs A, B, C, and D. A positive voltage signal supplied to one of these four inputs will connect an associated one of the resistors $R_A$, $R_B$, $R_C$ and $R_D$ between ground and resistor 39. The quad analog switch is available from Analog Devices, Inc. under Model No. ADG212A. AND gates 422, 424, 426 and 428 have their output circuits respectively connected to inputs A, B, C and D of the quad analog switch 420. The output circuit EXP1 of evaluation circuit EV-2' is directly connected to one input each of AND gates 424 and 428 and is also connected to one input each of AND gates 422 and 426 by way of an inverter 430. The output circuit EXP2 of evaluation circuit EV-N' is directly connected to one input of AND gates 426 and 428 and is also connected to one input each of AND gates 422 and 424 by way of an inverter 432.

From the foregoing circuitry, it is seen that if there are no expert votes, AND gate 422 applies a positive signal to input A of the quad analog switch 420 so that resistor $R_A$ is connected between ground and resistor 39. If there are two expert votes, AND gate 428 applies a positive signal to input D of the analog switch 420 and resistor $R_D$ is connected between ground and resistor 39. If only evaluation circuit EV-2' provides an expert vote, AND gate 424 applies a positive signal to input B of the quad analog switch 420 to connect resistor $R_B$ between ground and resistor 39. If only evaluation circuit EV-N' provides an expert vote, AND gate 426 applies a positive signal to the input C of the quad analog switch 420 to connect resistor $R_C$ between ground and resistor 39.

The weighting is such that if resistor $R_A$ is selected, it represents a resistance of 0.5 R. If resistor $R_B$ is selected, it represents a resistance of 7/11 R. Resistor $R_C$ is also equal to 7/11 R, whereas resistor $R_D$ is equal to 0.8 R.

There are 32 different combinations or examples of crash conditions which may be evaluated by the summing circuitry of FIG. 7. These are summarized in Table II below.

TABLE II

| No. | STD. WT. | EXP. WT. | VOTE | EXP. | TOT. VOTE | FIRE VOTE | FIRE/ TOTAL | RESULT |
|---|---|---|---|---|---|---|---|---|
| 1 | 321 | 011 | NNN | NNN | 6 | 0 | 0.00 | NO FIRE |
| 2 | 321 | 011 | NNN | NNY | 7 | 0 | 0.00 | NO FIRE |
| 3 | 321 | 011 | NNN | NYN | 7 | 0 | 0.00 | NO FIRE |
| 4 | 321 | 011 | NNN | NYY | 8 | 0 | 0.00 | NO FIRE |
| 5 | 321 | 011 | NNY | NNN | 6 | 1 | 0.17 | NO FIRE |
| 6 | 321 | 011 | NNY | NNY | 7 | 2 | 0.29 | NO FIRE |
| 7 | 321 | 011 | NNY | NYN | 7 | 1 | 0.14 | NO FIRE |
| 8 | 321 | 011 | NNY | NYY | 8 | 2 | 0.25 | NO FIRE |
| 9 | 321 | 011 | NYN | NNN | 6 | 2 | 0.33 | NO FIRE |
| 10 | 321 | 011 | NYN | NNY | 7 | 2 | 0.29 | NO FIRE |
| 11 | 321 | 011 | NYN | NYN | 7 | 3 | 0.43 | NO FIRE |
| 12 | 321 | 011 | NYN | NYY | 8 | 3 | 0.38 | NO FIRE |
| 13 | 321 | 011 | NYY | NNN | 6 | 3 | 0.50 | FIRE |
| 14 | 321 | 011 | NYY | NNY | 7 | 4 | 0.57 | FIRE |
| 15 | 321 | 011 | NYY | NYN | 7 | 4 | 0.57 | FIRE |
| 16 | 321 | 011 | NYY | NYY | 8 | 5 | 0.63 | FIRE |
| 17 | 321 | 011 | YNN | NNN | 6 | 3 | 0.50 | FIRE |
| 18 | 321 | 011 | YNN | NNY | 7 | 3 | 0.43 | NO FIRE |
| 19 | 321 | 011 | YNN | NYN | 7 | 3 | 0.43 | NO FIRE |
| 20 | 321 | 011 | YNN | NYY | 8 | 3 | 0.38 | NO FIRE |

TABLE II-continued

| No. | STD. WT. | EXP. WT. | VOTE | EXP. | TOT. VOTE | FIRE VOTE | FIRE/ TOTAL | RESULT |
|---|---|---|---|---|---|---|---|---|
| 21 | 321 | 011 | YNY | NNN | 6 | 4 | 0.67 | FIRE |
| 22 | 321 | 011 | YNY | NNY | 7 | 5 | 0.71 | FIRE |
| 23 | 321 | 011 | YNY | NYN | 7 | 4 | 0.57 | FIRE |
| 24 | 321 | 011 | YNY | NYY | 8 | 5 | 0.63 | FIRE |
| 25 | 321 | 011 | YYN | NNN | 6 | 5 | 0.83 | FIRE |
| 26 | 321 | 011 | YYN | NNY | 7 | 5 | 0.71 | FIRE |
| 27 | 321 | 011 | YYN | NYN | 7 | 6 | 0.86 | FIRE |
| 28 | 321 | 011 | YYN | NYY | 8 | 6 | 0.75 | FIRE |
| 29 | 321 | 011 | YYY | NNN | 6 | 6 | 1.00 | FIRE |
| 30 | 321 | 011 | YYY | NNY | 7 | 7 | 1.00 | FIRE |
| 31 | 321 | 011 | YYY | NYN | 7 | 7 | 1.00 | FIRE |
| 32 | 321 | 011 | YYY | NYY | 8 | 8 | 1.00 | FIRE |

Table II is quite similar to that of Table I described hereinbefore and includes each of the columns of Table I. Additionally, Table II includes a column headed EXP. WT. which stands for expert weight. This is the 0-1-1 weighting given to the circuitry of FIG. 7. There is no expert vote for evaluation circuit EV-1. However, there is a potential expert vote for each of evaluation circuits EV-2' and EV-N' resulting in the expert weighting of 0-1-1. Another column in Table II is headed EXP. That refers to the expert voting pattern of the three circuits in the order of evaluation circuits EV-1, EV-2' and EV-N'. A Y means a yes vote and an N means a no vote. The fraction represented by threshold f for the examples of Table II has been set at 0.45. Also to be noted is that there are 32 different combinations of votes represented by eight different combinations of FIRE votes and the four different combinations of expert votes.

Assigning an expert vote of one to each of the supplemental algorithms employed in the evaluation circuits EV-2' and EV-N' provides the supplemental algorithms with more of a say in determining the results if they self-determine their expertise. For example, in Table I at example number 5, the FIRE vote pattern is YNN, and the result is FIRE. The corresponding pattern of FIRE votes YNN is found in Table II at examples 17, 18, 19 and 20. However, because of the expert votes, a different decision, NO FIRE, is made in examples 18, 19 and 20.

Absolute Power

A modification of the circuitry in FIG. 7 is to provide one of the supplemental algorithms with absolute power in making a decision to deploy the restraint system. This is achieved by assigning a large weighting to that algorithm. Assume absolute power is to be given to the jerk algorithm employed in evaluation circuit EV-N'. This is implemented in the circuitry of FIG. 7 by increasing the weighting of this algorithm's expert vote by programming the current source 416 to provide a current having a value of 6 i. This changes the total vote from a potential of six votes to as many as thirteen votes. To achieve this, the gain of the amplifier 38 is further changed by varying the values of resistors $R_A$, $R_B$, $R_C$, and $R_D$. $R_A$ is set at 0.5 R whereas $R_B$ is set at 7/11 R, $R_C$ is set at 2 R and $R_D$ is set at 13/5 R.

These modifications to provide absolute power for the jerk algorithm in evaluation circuit EV-N' result in some different decisions as to whether to actuate the restraint system from that presented in Table II for the same FIRE vote patterns. This is summarized in Table III below.

TABLE III

| No. | STD. WT. | EXP. WT. | VOTE | EXP. | TOT. VOTE | FIRE VOTE | FIRE/ TOTAL | RESULT |
|---|---|---|---|---|---|---|---|---|
| 1 | 321 | 016 | NNN | NNN | 6 | 0 | 0.00 | NO FIRE |
| 2 | 321 | 016 | NNN | NNY | 12 | 0 | 0.00 | NO FIRE |
| 3 | 321 | 016 | NNN | NYN | 7 | 0 | 0.00 | NO FIRE |
| 4 | 321 | 016 | NNN | NYY | 13 | 0 | 0.00 | NO FIRE |
| 5 | 321 | 016 | NNY | NNN | 6 | 1 | 0.17 | NO FIRE |
| 6 | 321 | 016 | NNY | NNY | 12 | 7 | 0.58 | FIRE |
| 7 | 321 | 016 | NNY | NYN | 7 | 1 | 0.14 | NO FIRE |
| 8 | 321 | 016 | NNY | NYY | 13 | 7 | 0.54 | FIRE |
| 9 | 321 | 016 | NYN | NNN | 6 | 2 | 0.33 | NO FIRE |
| 10 | 321 | 016 | NYN | NNY | 12 | 2 | 0.17 | NO FIRE |
| 11 | 321 | 016 | NYN | NYN | 7 | 3 | 0.43 | NO FIRE |
| 12 | 321 | 016 | NYN | NYY | 13 | 3 | 0.23 | NO FIRE |
| 13 | 321 | 016 | NYY | NNN | 6 | 3 | 0.50 | NO FIRE |
| 14 | 321 | 016 | NYY | NNY | 12 | 9 | 0.75 | FIRE |
| 15 | 321 | 016 | NYY | NYN | 7 | 4 | 0.57 | FIRE |
| 16 | 321 | 016 | NYY | NYY | 13 | 10 | 0.77 | FIRE |
| 17 | 321 | 016 | YNN | NNN | 6 | 3 | 0.50 | NO FIRE |
| 18 | 321 | 016 | YNN | NNY | 12 | 3 | 0.25 | NO FIRE |
| 19 | 321 | 016 | YNN | NYN | 7 | 3 | 0.43 | NO FIRE |
| 20 | 321 | 016 | YNN | NYY | 13 | 3 | 0.23 | NO FIRE |
| 21 | 321 | 016 | YNY | NNN | 6 | 4 | 0.67 | FIRE |
| 22 | 321 | 016 | YNY | NNY | 12 | 10 | 0.83 | FIRE |
| 23 | 321 | 016 | YNY | NYN | 7 | 4 | 0.57 | FIRE |
| 24 | 321 | 016 | YNY | NYY | 13 | 10 | 0.77 | FIRE |
| 25 | 321 | 016 | YYN | NNN | 6 | 5 | 0.83 | FIRE |
| 26 | 321 | 016 | YYN | NNY | 12 | 5 | 0.42 | NO FIRE |
| 27 | 321 | 016 | YYN | NYN | 7 | 6 | 0.86 | FIRE |
| 28 | 321 | 016 | YYN | NYY | 13 | 6 | 0.46 | NO FIRE |
| 29 | 321 | 016 | YYY | NNN | 6 | 6 | 1.00 | FIRE |

TABLE III-continued

| No. | STD. WT. | EXP. WT. | VOTE | EXP. | TOT. VOTE | FIRE VOTE | FIRE/ TOTAL | RESULT |
| --- | --- | --- | --- | --- | --- | --- | --- | --- |
| 30 | 321 | 016 | YYY | NNY | 12 | 12 | 1.00 | FIRE |
| 31 | 321 | 016 | YYY | NYN | 7 | 7 | 1.00 | FIRE |
| 32 | 321 | 016 | YYY | NYY | 13 | 13 | 1.00 | FIRE |

From a comparison of Table III with Table II, it will be noted that each has the same column headings and that each has 32 different examples. The fraction represented by the threshold level f for Table III has been set at 0.50.

With the noted modifications being made to FIG. 7 to achieve absolute power for the jerk algorithm, a comparison may now be made of the differences in the results by comparing Table III with Table II. The results in Table III for examples 6, 8, 26 and 28 differ from the same examples in Table II as a result of assigning an expert weight of six to the jerk algorithm (Table III) as opposed to an expert weight of one (Table II). The different results in examples 13 and 17 in Tables II and III is a result of changing the majority fraction from 0.45 (Table II) to 0.50 (Table III).

Implementation of Expertise Circuits

The evaluation circuit EV-2' employing the displacement algorithm is provided with an expertise circuit 260 as illustrated in FIG. 4 for determining whether the circuit EV-2' and its associated algorithm is an expert in a particular crash condition. If such a determination is made, the evaluation circuit provides a positive output signal on its output circuit EXP1.

The expertise circuit 260 in FIG. 4 includes an additional resettable timer 262 constructed in the same manner as resettable timers 130 and 132 discussed above. All of the trigger inputs TR of the three timers are connected together and all of their reset inputs RST are connected together. Timer 262 times a time period TSE that commences with time periods T1 and T2 but is of longer duration than that of time period T1 and is of shorter duration than that of time period T2.

For the evaluation circuit EV-2' to provide a FIRE vote, the double-integrated output signal from integrator 200 must exceed the displacement threshold level S supplied to comparator 144', as seen in waveforms L and M in FIG. 3. The crash condition under examination does not result in a FIRE vote even though the velocity signal exceeds its threshold level V, as is seen in waveforms J and K of FIG. 3. This may be due to the displacement lagging the velocity because of a delayed onset of large acceleration followed by an immediate presence of a large jerk. In this example, the displacement algorithm does not vote to FIRE but does measure a displacement greater than a displacement threshold level S* sometime after the time duration TSE has timed out, but before the time duration T2 has timed out. As seen in waveform L, the displacement threshold level S* is lower than that of displacement threshold level S. An expert determination by the expertise circuit 260 is made when the displacement is in excess of the threshold level S* but less than the threshold level S at some time greater than time duration TSE but less than time duration T2. This is accomplished with the circuitry discussed below.

The threshold level S* may be obtained from a voltage divider including resistors 264 and 266 connected between a B+ voltage supply source and ground. A comparator 268 compares the double-integrated output signal from the integrator 200 with the threshold level S* and provides a positive output signal so long as this condition continues, as is seen in waveform P of FIG. 3. This positive output signal is supplied as one input to an AND gate 270.

A second input to the AND gate 270 is taken from the output of comparator 144' by way of an inverter 272. So long as the double-integrated output of integrator 200 is less than the threshold level S, the comparator 144' provides a low level signal. This is inverted by inverter 272 to supply a positive signal to the AND gate 270.

Once the timer 262 times out the time period TSE, it provides a positive-going signal at its output circuit OUT. This positive signal is also applied to the AND gate 270.

So long as timer 132 has not timed out the time period T2, its output circuit OUT carries a low level signal and this is inverted by an inverter 274 to supply a positive signal to the AND gate 270. However, once the timer 132 times out the time period T2, it provides a positive-going signal at its output terminal OUT to thereby prevent the AND gate 270 from providing a positive output. Consequently, if the displacement is in excess of the threshold level S* but less than the threshold level S at some time after timer 262 times out but before timer 132 times out, the AND gate 270 will provide a positive output signal to trigger a one-shot circuit 280 which will then provide a positive-going signal on the output circuit EXP1 for a fixed time duration. This is indicative that the expertise circuit 260 has determined that the displacement algorithm is the expert in evaluating the crash condition under examination.

Jerk Algorithm Expertise

Reference is now made to FIG. 5 which illustrates the jerk algorithm expertise circuit 360 included in the evaluation circuit EV-N' Expertise circuit 360 serves to determine whether or not the evaluation circuit EV-N' and its associated jerk algorithm is the expert on the type of crash being evaluated. If so, then the circuit 360 provides a positive output signal on its output circuit EXP2.

In circuit 360, a determination that evaluation circuit EV-N' and jerk algorithm is the expert is based on determining whether or not the jerk signal obtained from the differentiator 336 exceeds a threshold level X*, lower than that of the threshold level X, after a time period TJE1 has elapsed and before a time period TJE2 has elapsed (see waveforms K, L, and M in FIG. 6). Both of these time periods TJE1 and TJE2 are less than that of time period T3.

To accomplish this, the expertise circuit 360 includes additional timers 362 and 364 constructed in the same manner as timer 346 described hereinbefore. The three timers 346, 362 and 364 have their IN terminals connected together. Consequently, each timer is triggered to commence timing its time period when the output of comparator 330 goes positive (see waveform E in FIG. 6).

The output circuit of timer 362 is connected to one input of an AND gate 366. Timer 362 times the time period TJE1 and, when the timer has timed out, it provides a positive-going signal on its output terminal OUT. This positive signal is supplied to the AND gate 366.

The timer 364 times out time period TJE2 and then provides a positive-going signal at its output terminal OUT. Before timer 364 times out, its output terminal OUT carries a low level signal which is inverted by an inverter 365 to apply a positive signal to the AND gate 366. The AND gate 366 is now enabled to determine whether or not the magnitude of the differentiated signal obtained from differentiator 336 exceeds that of the threshold level X* before timer 364 times out. The threshold level X* is obtained from a voltage divider including a pair of resistors 370 and 372 connected between a B+ voltage supply source and ground.

When the magnitude of the differentiated signal obtained from differentiator 336 exceeds that of the threshold level X*, comparator 368 applies a positive signal to the enabled AND gate 366. AND gate 366 now applies a positive signal to a one-shot circuit 369 to provide a positive output signal at the output terminal EXP2 for a given period of time. This is a determination in that the expertise circuit 360 has decided that evaluation circuit EV-N' and the jerk algorithm is the expert for the type of crash condition being evaluated.

Microprocessor Version

Figures 8, 9:
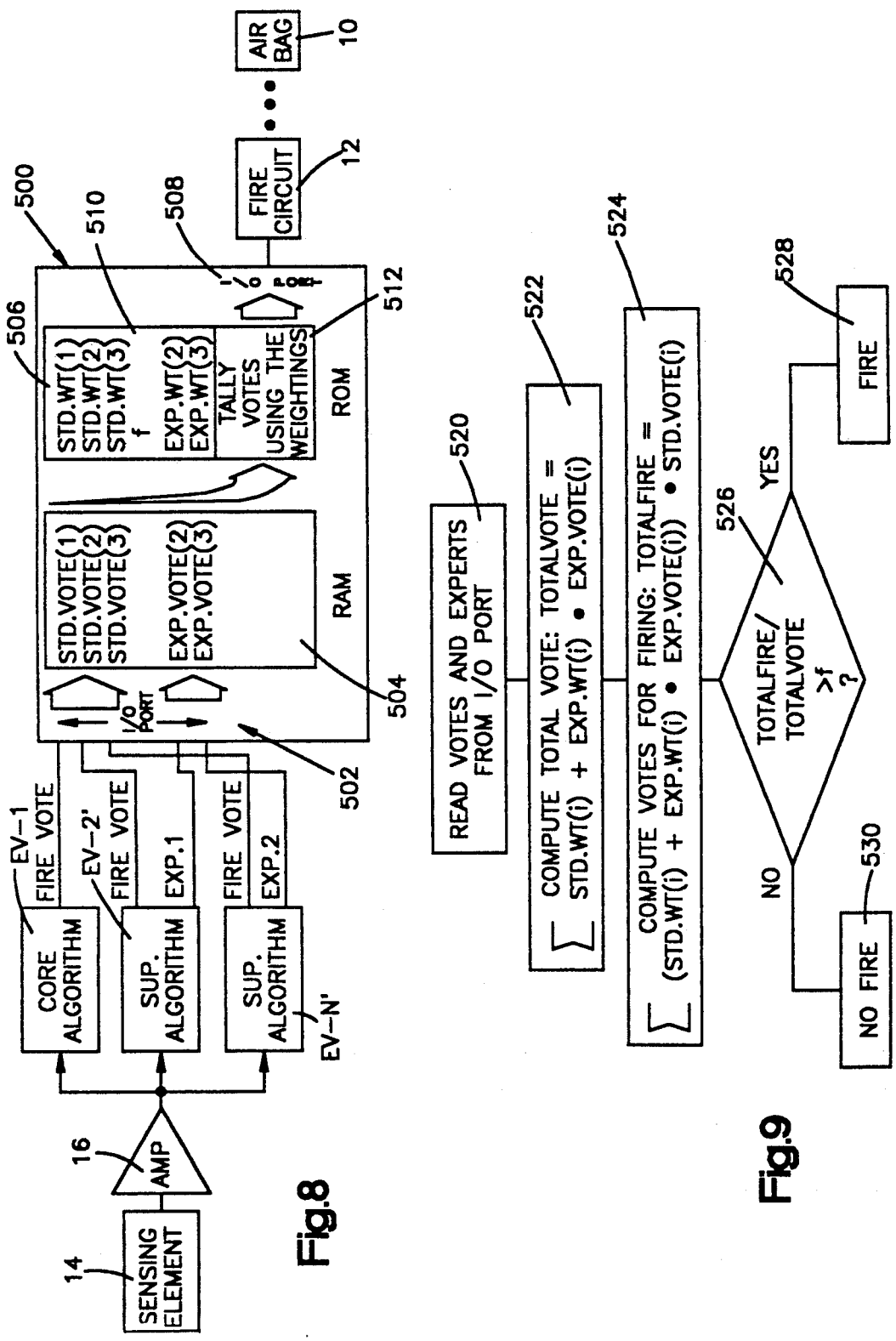
FIG. 8 is a schematic-block diagram illustration of another embodiment of the present invention.
FIG. 9 is a flow chart useful in describing the operation of the circuit in FIG. 8.

Reference is now made to FIGS. 8 and 9 which illustrate a microprocessor implementation of the circuitry illustrated in FIGS. 1 and 7. This embodiment employs the evaluation circuits EV-1 of FIGS. 1 and 7, as well as the evaluation circuits EV-2' and EV-N' of FIG. 7. As in the circuitry of FIG. 7, the inputs to the evaluation circuits are all obtained from a single sensing element 14 by way of an amplifier 16. The outputs of the evaluation circuits EV-1, EV-2' and EV-N' are supplied to a microprocessor 500 which will be described below in conjunction with FIG. 9. The microprocessor is programmed to perform the functions of the analog circuitry in FIG. 7 and, when a decision is made to actuate the restraint system, the microprocessor applies a trigger signal to the firing circuit 12 to deploy the airbag 10.

The microprocessor 500, as is conventional in the art, includes an input/output port 502 for receiving variables, a random access memory (RAM) 504 for storing the variables received by the input/output port 502, a read only memory (ROM) 506 which stores the program as well as weight parameters, and an input/output port 508 which communicates with the firing circuit 12. Memory 506 may be considered as being divided into portions 510 and 512. Portion 510 stores the weight parameters, whereas portion 512 stores the program.

The microprocessor 500 is programmed so that it operates in accordance with the flow chart of FIG. 9. The microprocessor reads the variables including the FIRE votes from evaluation circuits EV-1, EV-2' and EV-N' and the expert votes from evaluation circuits EV-2' and EV-N'. The FIRE votes and expert votes are variables and are stored in the random access memory 504 as either a YES vote or a NO vote as indicated in Tables I, II and III. The FIRE votes from evaluation circuits EV-1, EV-2' and EV-N' are respectively referred to in FIG. 8 as STD. VOTE (1), STD. VOTE (2), and STD. VOTE (3). The expert votes are also stored as either YES votes or NO votes in accordance with Tables II and III. The expert votes from evaluation circuits EV-2' and EV-N' are respectively referred to in FIG. 8 as EXP. VOTE (2) and EXP. VOTE (3).

The standard weights, such as the weighting patterns 3-2-1 in Tables II and III are stored in memory portion 510. In the example under consideration, the core algorithm of evaluation circuit EV-1 is assigned a weight of 3. This information is stored in memory portion 510 and is designated therein as STD. WT. (1). The weighting given to the algorithm in evaluation circuit EV-2' is 2 and this is stored in memory portion 510 as STD. WT.(2). Also, the weight assigned to the algorithm in evaluation circuit EV-N' is 1 and this is stored in memory portion 510 as STD. WT. (3).

The expert weights are also stored in memory portion 510. The expert weights for the algorithms in evaluation circuits EV-2' and EV-N' are each one for the examples presented in Table II. In FIG. 8, the expert weight for evaluation circuit EV-2' is designated as EXP WT. (2), whereas that for evaluation circuit EV-N' is designated as EXP. WT. (3).

In the event that the algorithm in the evaluation circuit EV-N' is to be given an absolute power in making a decision for actuating the restraint system, then its expert weight EXP. WT. (3) is given a weight of six, in accordance with the examples set forth in Table III.

The majority fraction threshold level f is given a value of 0.45 for the operations represented by Tables I and II and is given a value of 0.50 for the examples of Table III.

The microprocessor 500 is programmed to operate in accordance with the flow chart of FIG. 9. In step 520, the microprocessor is programmed to read both the FIRE votes and the experts votes as either YES or NO and store this information in the random accessory memory 504. The microprocessor, in accordance with step 522 of FIG. 9, computes the total vote which is six for the example of Table I, but is a variable amount for that in Tables II and III as it must make a summation of the standard weights plus the expert weights and the expert votes in accordance with the examples given hereinbefore in Tables II and III. Thus, the total vote for the examples of Table II may vary from six to eight, whereas the total vote in the examples of Table III may vary from six to thirteen.

In step 524 of the flow chart in FIG. 9, it is seen that the microprocessor is programmed to compute the total vote for firing in accordance with the FIRE vote totals indicated in Tables I, II, and III. For the operation in accordance with Table I, the total FIRE vote may vary from zero to six, whereas in Table II, it may vary from zero to eight, and in Table III it may vary from zero to thirteen.

In step 526 of the flow chart in FIG. 9, it is seen that the microprocessor is further programmed to determine whether the ratio of the total FIRE vote to the total vote is greater than the majority fraction f. If the determination is YES, then, in accordance with step 528, the microprocessor triggers the FIRE circuit 12 to deploy the airbag 10. If the decision is NO, then, in accordance with step 530, a NO FIRE decision has been reached.

Whereas the invention has been described in conjunction with preferred embodiments, it is to be appreciated that various modifications may be made without departing from the spirit and scope of the invention as defined by the appended claims.

Having described a preferred embodiment of the invention, I claim:

1. Apparatus for actuating a passenger restraint system in a passenger vehicle, comprising:
   sensor means for sensing vehicle deceleration, and providing a deceleration signal having a value that varies in accordance with said deceleration;
   a plurality of crash evaluation circuits, each responsive to said deceleration signal for evaluating said deceleration signal in accordance with respectively different crash evaluation algorithms, each said evaluation circuit having an output circuit and having means for providing a FIRE vote signal on said output circuit when its evaluation of the deceleration signal indicates that the restraint system should be actuated;
   crash evaluation expertise means associated with at least one of said plurality of crash evaluation circuits with each said expertise means having an expert output circuit and having means for providing an expert signal on its expert output circuit when the expertise means determines that its associated evaluation circuit is an expert in evaluating the type of crash condition represented by said deceleration signal;
   means for summing said FIRE vote signals and said expert signals for providing a summation signal having a value dependent on the sum of said FIRE vote signals and said expert signals; and,
   means for providing a trigger signal for actuating said restraint system when the value of said summation signal exceeds a threshold level.

2. Apparatus as set forth in claim 1 including N said crash evaluation circuits and N−1 said expertise means respectively associated with N−1 of said crash evaluation circuits.

3. Apparatus as set forth in claim 2 wherein said summing means includes N current sources respectively connected in series with said output circuits of said N crash evaluation circuits and in series with a summing resistor.

4. Apparatus as set forth in claim 3 wherein said summing means further includes N−1 current sources respectively connected in series with said output circuits of said N−1 expertise means and in series with said summing resistor.

5. Apparatus as set forth in claim 4 wherein each of said N current sources provides current flow in its series circuit when the output circuit of its associated one of said N crash evaluation circuits provides a said FIRE vote signal.

6. Apparatus as set forth in claim 5 wherein each of said N current sources provides current flow which differs in magnitude from the current flow of each of the other current sources.

7. Apparatus as set forth in claim 6 wherein each of said N−1 current sources provides current flow of the same constant magnitude in its series circuit when the output circuit of its associated one of said N−1 expertise means provides a said expert signal.

8. Apparatus as set forth in claim 7 wherein said summing means includes a summing amplifier coupled to said summing resistor for providing said summation signal.

9. Apparatus as set forth in claim 8 including gain adjustment means for varying the gain of said summing amplifier in dependence upon whether one or more of said N−1 expertise means provides a said expert signal.

10. Apparatus as set forth in claim 6 wherein a selected one of said N−1 current sources provides substantially more current than any of said other current sources.

11. A method of actuating a passenger restraint system in a passenger vehicle, comprising the steps of:
    sensing vehicle deceleration and providing a deceleration signal having a value that varies in accordance with said deceleration;
    evaluating said deceleration signal with different crash evaluation algorithms, each algorithm evaluating said deceleration signal and determining whether the restraint system should be actuated and, if so, providing a fire signal;
    determining for at least one of said algorithms whether it is the expert for evaluating the deceleration signal and, if so, providing an expert signal;
    summing said fire signals and those of said expert signals for which a fire signal was provided for the associated algorithm and providing a summation signal having a value in accordance with the sum of said fire signals and those of said expert signals; and,
    actuating said restraint system when the value of said summation signal exceeds a threshold level.

12. A method as set forth in claim 11 including the steps of assigning different weights to said fire signals for said different algorithms so that said summing step sums the weighted values of said fire signals.

13. A method as set forth in claim 12, including the step of assigning equal weights to said expert signals so that said summing step sums the weighted values of said first signals and of those of said expert signals.

14. A method as set forth in claim 12, including the step of assigning unequal weights to said expert signals wherein the weight assigned to one of said expert signals is sufficiently large that when said one weighted expert signal is summed with its associated fire signal the magnitude of said summation signal will exceed that of said threshold level to thereby actuate said restraint system.

15. A method as set forth in claim 13 or 14 including the step of using computer means programmed for receiving said fire signals and said expert signals and for assigning said weighting thereto and for performing said summing step.

* * * * *